UNITED STATES PATENT OFFICE.

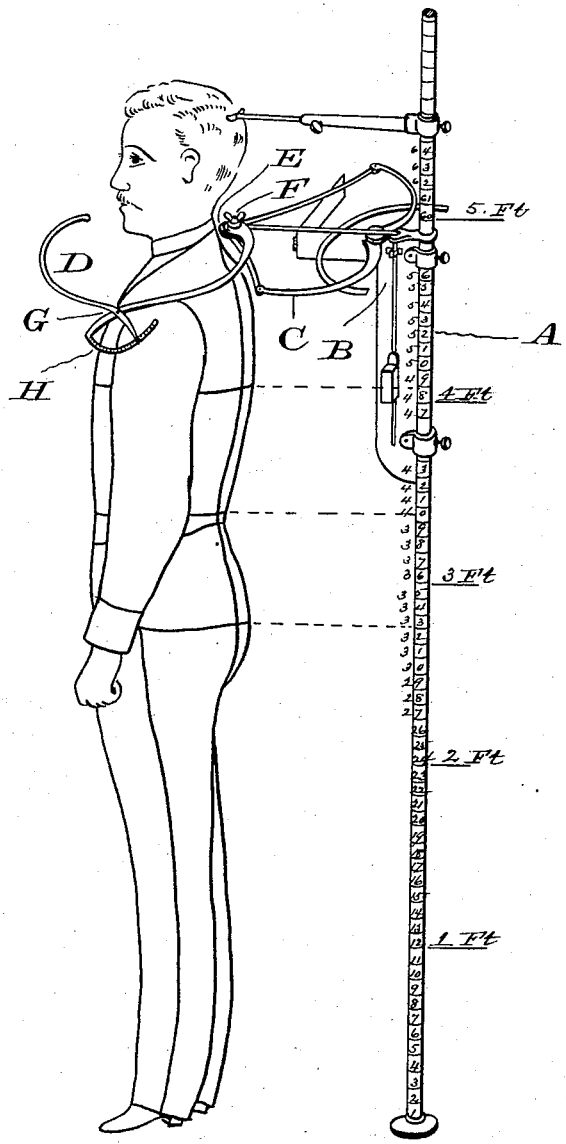

JOHN S. HAND, OF SAN FRANCISCO, CALIFORNIA.

TAILOR'S MEASURING DEVICE.

SPECIFICATION forming part of Letters Patent No. 324,022, dated August 11, 1885.

Application filed January 23, 1885. (No model.)

*To all whom it may concern:*

Be it known that I, JOHN S. HAND, a subject of the Queen of Great Britain, and residing at San Francisco, in the county of San Francisco and State of California, have invented certain new and useful Improvements in Tailors' Measuring Devices, of which the following is a specification.

My present invention relates to an improvement upon the calipers mentioned in Letters Patent No. 299,383, granted to me on the 27th day of May, 1884, for an improved tailor's measuring device; and the object of my improvement is to provide a ready means whereby horizontal measurements may be taken at different points of altitude on the human figure with ease and certainty, and at the same time that the vertical measurements are taken. This object I accomplish by means of the device illustrated in the accompanying drawing, which represents in perspective a view of my improved calipers connected with the measuring device mentioned in my former Letters Patent herein referred to.

A represents a vertical rod graduated to inches and fractional parts thereof. This rod extends from the floor to the ceiling, and is secured in position by a step at the bottom and a cap at the top thereof, and upon this rod is adjustably secured a bracket, B, having a hinged horizontal arm, while to the rigid portion of the horizontal arm are pivoted the lazy-tongs C.

To the forward end of the lazy-tongs I secure one arm or blade of the calipers D by the end or point thereof.

The point E of the calipers, by which they are attached to the lazy-tongs, is made broad and flat, so as to form a suitable bearing-surface for the thumb-screw F, the bolt of which also passes through the forward end of the lazy-tongs, and forms the forward pivotal point thereof.

It should here be remarked that the forward end of the lazy-tongs and the point E of the calipers should coincide with each other, or, in other words, are both on the same vertical line.

The two blades or arms of the calipers are connected together by a pivot, G, and one of the shorter arms is provided with a graduated arc, H, over which the point of the other arm moves, and this other arm or the point thereof may be provided with a magnifying-glass, to assist the eye of the operator in determining the true position of the pointer upon the scale which indicates the distance that the measuring ends or points of the long arms of the calipers are from each other.

By means of this arrangement and combination of the calipers with a device for obtaining vertical measurements of the human figure I am enabled at the same time that each vertical measurement is taken, and at the indicated height thereof, to obtain the necessary horizontal or diametrical measurements of either the body, arms, or legs, and from side to side or from front to rear, and the measurements so taken can be recorded with more ease, accuracy, and expedition than by any other means with which I am acquainted.

Having thus described my invention, what I claim, and desire to secure by Letters Patent, is—

1. In a tailor's measuring device, the combination, with the vertical rod A, adjustable bracket B, and lazy-tongs C, of the calipers D, attached by one arm to the lazy-tongs, substantially as shown, for the purpose set forth.

2. In a tailor's measuring device, the combination, with a vertically-adjustable support, of the lazy-tongs C, pivoted to said support, and the calipers D, attached by one arm to said lazy-tongs and provided with a graduated arc, H, substantially as and for the purposes described.

In testimony that I claim the foregoing I have hereunto set my hand and seal.

JOHN S. HAND. [L. S.]

Witnesses:
WILMER BRADFORD,
JAMES L. KING.